DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 3, 1975

935 O.G. 9

T935,001

SOFT ADHESIVE FOR TWO-ADHESIVE POLYESTER BAGS

Aurelius Franklin Chapman, 2417 Brookshire Drive, Wilmington, Del. 19803

Continuation of application Ser. No. 207,636, Dec 13, 1971. This application Jan. 2, 1974, Ser. No. 430,051

Int. Cl. B65d *33/20, 33/22;* B32b *7/14*

U.S. Cl. 229—53

No Drawing. 6 Pages Specification

A thermoplastic adhesive suitable for use as the inner shock-absorbing band in a double adhesive band bag closure comprising (a) a polymer selected from the group consisting of plasticized polyvinyl acetate and plasticized polyacrylate wherein the plasticizer is present in an amount preferably ranging from 30 to 150 parts per 100 parts of polymer; and (b) about 2 to 30 parts, preferably 5 to 15 parts, of a vinylidene chloride copolymer, per 100 parts of plasticized polymer, containing from about 40 to 85 weight percent vinylidene chloride.

ERRATA

In the notices of Defensive Publications appearing on pages 9–12 in the Official Gazette of June 3, 1975, the names of the assignees were omitted and should be added as indicated below:

T935,001. E. I. du Pont de Nemours and Company, Wilmington, Del.
T935,002. Pacific Lighting Service Co., Los Angeles, Calif.
T935,003. International Business Machines Corporation, Armonk, N.Y.
T935,004. International Business Machines Corporation, Armonk, N.Y.
T935,005. International Business Machines Corporation, Armonk, N.Y.
T935,006. E. I. du Pont de Nemours and Company, Wilmington, Del.

In the notices of Defensive Publications appearing on pages 7 and 8 in the Official Gazette of July 1, 1975, the following names of assignees were omitted and should be added:

T936,001. E. I. du Pont de Nemours and Company, Wilmington, Del.
T936,002. E. I. du Pont de Nemours and Company, Wilmington, Del.
T936,005. Du Pont of Canada Limited, Quebec, Canada